E. S. MORRELL.
JUNCTION BOX COUPLING.
APPLICATION FILED JULY 24, 1906.
917,342.
Patented Apr. 6, 1909.
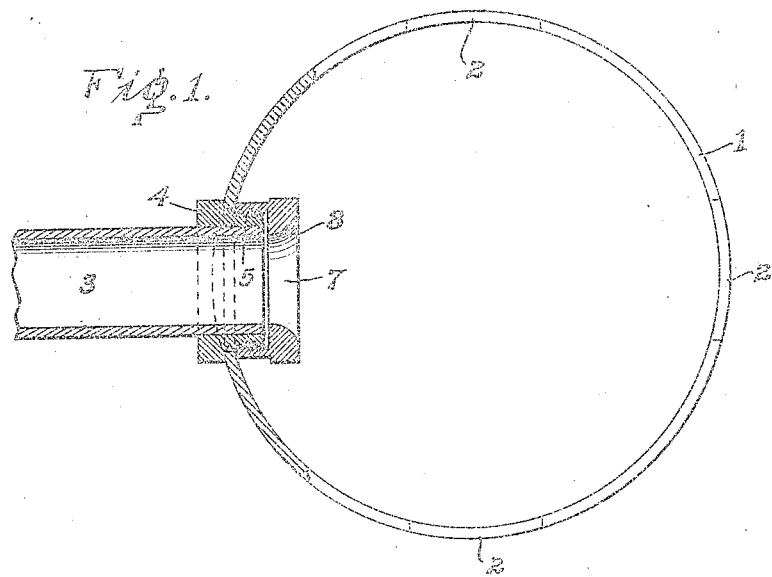
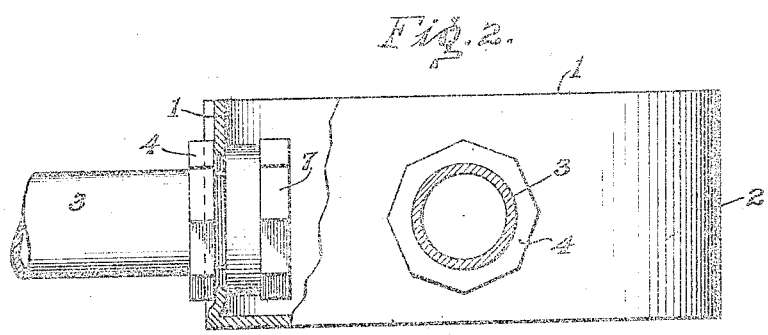
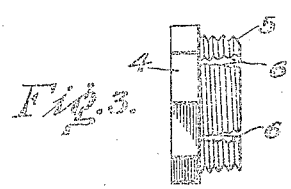
Witnesses
Daniel Webster, Jr.
Anna E. Steinbock
Inventor
Edward S. Morrell
By his Attorney

UNITED STATES PATENT OFFICE.

EDWARD S. MORRELL, OF PHILADELPHIA, PENNSYLVANIA.

JUNCTION-BOX COUPLING.

No. 917,342.      Specification of Letters Patent.      Patented April 6, 1909.

Application filed July 24, 1908. Serial No. 445,090.

*To all whom it may concern:*

Be it known that I, EDWARD S. MORRELL, a citizen of the United States, residing in the city of Philadelphia, county of Philadelphia, and State of Pennsylvania, have invented a new and useful Junction-Box Coupling, of which the following is a specification.

My invention relates to junction box couplings for electric wire conduits, such as metallic pipe conduits and junction or outlet boxes commonly used in the concealed electric wiring of buildings, etc.

It is the object of my invention to provide an improved coupling for attaching pipe conduits to outlet or junction boxes which shall be low in cost and capable of easy and quick installation or application.

To this end, my invention comprises the parts hereinafter described and claimed, which permit the coupling of a pipe conduit to a junction or outlet box without requiring or resorting to screw threads upon either the junction box or the conduit pipe.

For an illustration of one of the forms my invention may take, reference is to be had to the accompanying drawing, in which:

Figure 1 is a top plan view, partly in section, of a junction or outlet box, the conduit pipe and coupling being shown in horizontal section. Fig. 2 is a side elevation of a junction or outlet box, part of the box being shown in section with the conduit pipe and coupling in elevation. Fig. 3 is a side view of the coupling nipple.

A junction or outlet box 1 of any suitable standard or other type, and of any suitable shape, here shown circular by way of example, has a plurality of openings 2 to receive the conduit pipes 3. The conduit pipe 3, shown in section in Fig. 1 and in elevation in Fig. 2, has placed over the end thereof the nipple 4 having a hexagonal, octagonal, or other shaped head, and a screw threaded shank 5, preferably tapering, provided with one or more longitudinal V or other shaped slits 6. This nipple fits over the outside of the conduit pipe 3 and when so slipped over the conduit pipe, with the end of the shank 5 practically even with the end of the conduit pipe 3, the same is introduced through one of the openings 2 in a wall of the junction or outlet box 1, the opening being large enough to let the screw threaded shank 5 of the nipple 4 pass freely through. Then, from the inside of the box 1 the nut 7 is threaded on to the shank 5 of the nipple 4, and, as it advances, it forces the sections of the shank 5, radially yielding or resilient because of the slits or slots 6, firmly against and entirely around the outside of the conduit pipe 3 thus firmly clamping the nipple 4 to the conduit pipe 3 and eventually clamping the wall of the box 1 firmly between the shoulder of the nipple 4 and the end of the nut 7. The nut 7 has a hexagonal, octagonal, or other shaped head for receiving a wrench or other suitable driving means. As here shown, the opening through the head of the nut 7 is of the same diameter as the internal diameter of the conduit pipe 3 and a curved fillet 8 is provided so that when wires are drawn through the conduit pipe and nut 7 there will be no sharp edge to tear or abrade the insulation or covering on the wires.

By the construction above described, neither the junction or outlet box nor the conduit pipe need be screw threaded, and the nipple is firmly clamped to the conduit pipe by the advance of the nut, and after thus being firmly clamped to the conduit pipe it acts as an integral part of the conduit pipe to provide a shoulder between which and the nut the wall of the junction or outlet box is firmly clamped, thus forming a firm connection between the conduit pipe and box.

While the nut 7 is here shown as applied from the inside of the box, it is to be understood that the nut and nipple may be reversed, and the nut applied from the outside of the box, the nut, in such case, having an internal diameter sufficient to pass over the outside of the conduit pipe 3.

By the arrangement herein described, the nipple has no relative movement, either longitudinal or rotary, with respect to the conduit pipe 3, but, as the nut is advanced, is more and more firmly clamped to the conduit pipe.

As here shown, the junction or outlet box is circular in form and if of drawn metal, the parts will flatten the side of the box, as indicated in the drawings, and clamp the same where flattened between the nut and the nipple. It is to be understood, of course, that other types and shapes of boxes may be used with equal advantage and may be made of drawn or other metal, or other material.

The nipple 4 and the nut 7 may be made of any suitable material, such as malleable iron castings, brass, etc. The construction is exceedingly cheap for that the nuts and nipples may be cast, and by simple operation screw threaded, the slits or slots 7 being cored, if desired, and not requiring separate machining or manipulation. The nuts and nipples may be made in quantities and used by the wiremen when assembling the boxes and conduit pipes; the box and conduit pipe, as heretofore pointed out, requiring no screw threading or other treatment or machining.

What I claim is:

1. The combination with a non-threaded junction box, of a non-threaded conduit pipe, and a coupling for attaching said conduit pipe to said box comprising a nut and a radially resilient nipple, said nipple surrounding said non-threaded conduit pipe and adapted to be clamped to said conduit pipe by the advance of said nut upon said nipple, and said box clamped between said nipple and nut.

2. The combination with a non-threaded junction box, of a non-threaded conduit pipe, and a coupling for attaching said conduit pipe to said box comprising a nut and a nipple, said nipple being interiorly smooth to receive said non-threaded conduit pipe and resilient and screw threaded to receive said nut, and adapted to be clamped to said conduit pipe by the advance of said nut, said box being clamped between said nipple and nut.

3. The combination with a junction box having a perforated wall, of an exteriorly smooth non-threaded conduit pipe, an interiorly smooth and resilient nipple passing over and disposed substantially at the end of said conduit pipe, said nipple and pipe extending through a perforation in said junction box, said nipple being exteriorly screw-threaded and having a shoulder, and a nut adapted to advance upon the screw threads of said nipple to clamp said nipple to said conduit pipe and to clamp said box between itself and said nipple shoulder.

4. A coupling for attaching non-threaded conduit pipes to junction boxes comprising a shouldered radially resilient exteriorly screw-threaded and interiorly smooth nipple, and a nut adapted to advance upon the screw threads of said nipple to clamp the same to the exterior of a non-threaded conduit pipe and adapted to secure a junction box against the nipple shoulder.

In testimony whereof I have hereunto affixed my signature in the presence of the two subscribing witnesses.

EDWARD S. MORRELL.

Witnesses:
 ANNA E. STEINBOCK,
 DANIEL WEBSTER, Jr.